United States Patent
Pinarbasi

(10) Patent No.: US 7,194,797 B2
(45) Date of Patent: Mar. 27, 2007

(54) METHOD FOR USE IN FORMING A READ SENSOR FOR A MAGNETIC HEAD

(75) Inventor: Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 478 days.

(21) Appl. No.: 10/881,439

(22) Filed: Jun. 30, 2004

(65) Prior Publication Data

US 2006/0000078 A1   Jan. 5, 2006

(51) Int. Cl.
   G11B 5/127     (2006.01)
   G11B 5/33      (2006.01)
   B44C 1/22      (2006.01)

(52) U.S. Cl. .............................. 29/603.14; 29/603.12; 29/603.15; 29/603.16; 29/603.18; 216/22; 360/326; 360/327; 360/317

(58) Field of Classification Search ............. 29/603.14, 29/603.12, 603.15, 603.18; 204/192.32, 204/192.33, 192.34; 216/22, 66; 360/326, 360/126, 314, 315, 316, 317
   See application file for complete search history.

(56) References Cited

U.S. PATENT DOCUMENTS

| | | | |
|---|---|---|---|
| 5,442,507 A * | 8/1995 | Koga et al. ................. 360/322 |
| 5,491,600 A * | 2/1996 | Chen et al. ................. 360/322 |
| 5,893,981 A * | 4/1999 | Dovek et al. ................. 216/22 |
| 6,218,056 B1 * | 4/2001 | Pinarbasi et al. .............. 430/5 |
| 6,353,318 B1 | 3/2002 | Sin et al. |
| 6,421,212 B1 | 7/2002 | Gibbons et al. |
| 2002/0011460 A1 | 1/2002 | Seigler et al. |
| 2002/0146580 A1 | 10/2002 | Wang et al. |
| 2003/0034324 A1 | 2/2003 | Ueda et al. |

\* cited by examiner

*Primary Examiner*—A. Dexter Tugbang
*Assistant Examiner*—Tai Van Nguyen
(74) *Attorney, Agent, or Firm*—John J. Oskorep, Esq.; Matthew Zises, Esq.

(57) ABSTRACT

Methods for use in forming a CPP read sensor for a magnetic head are disclosed. In a particular example, a plurality of read sensor layers are formed over a first shield layer and a resist without undercuts is formed over the plurality of read sensor layers in a central region. With the resist in place, read sensor materials in side regions adjacent the central region are removed by milling to thereby form a read sensor structure in the central region. Insulator materials and metallic seed materials are then deposited in the side regions. High angle ion milling is performed to reduce a thickness of the insulator materials, the metallic seed materials, or both, along sidewalls of the read sensor structure. Magnetic hard bias materials are subsequently deposited over the metallic seed materials, and a second shield layer is formed over the structure after the resist is removed. Advantageously, the high angle ion milling more closely aligns the hard bias materials with a free layer structure in the read sensor structure such that the effectiveness of the hard bias materials is increased.

30 Claims, 10 Drawing Sheets

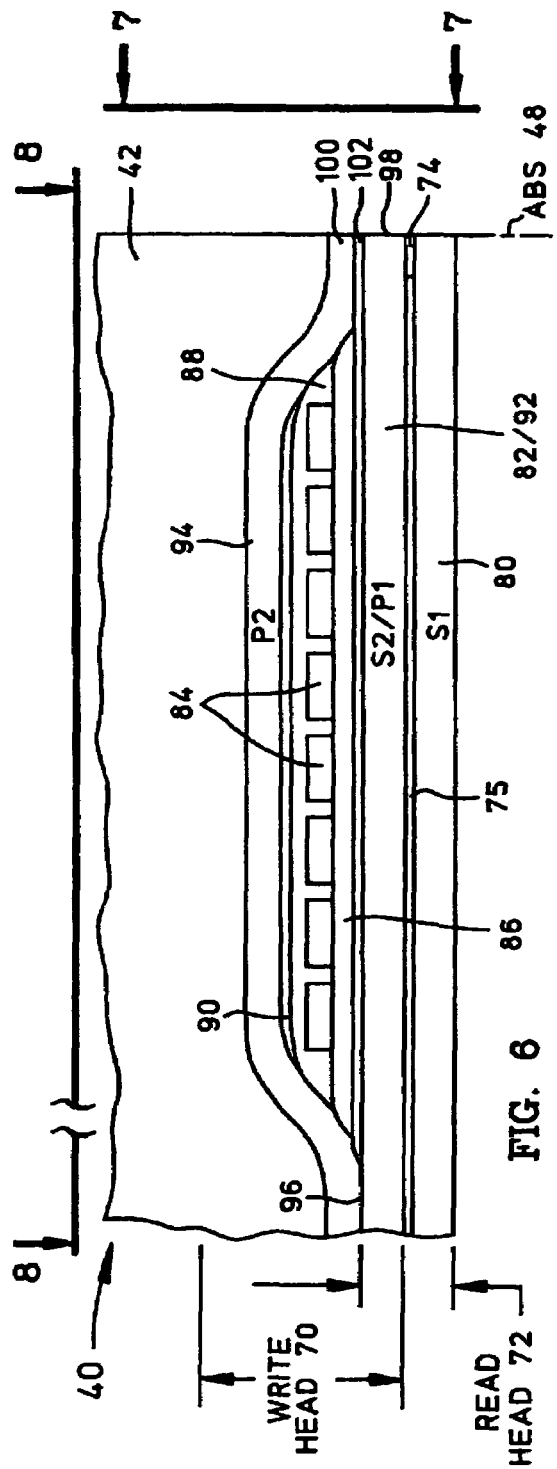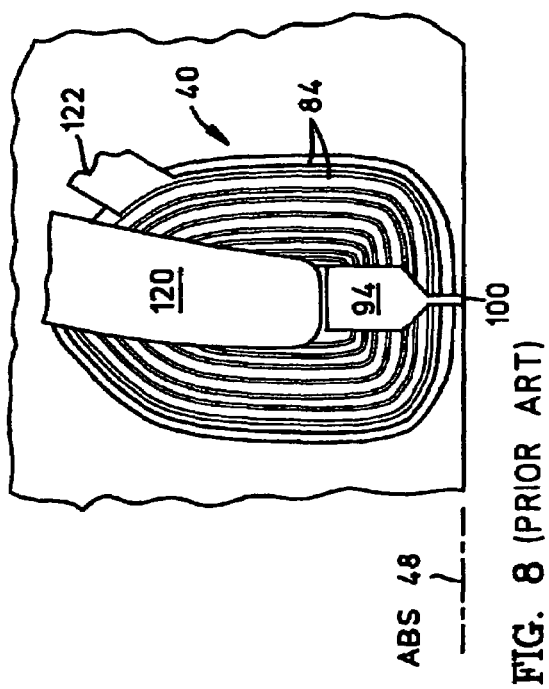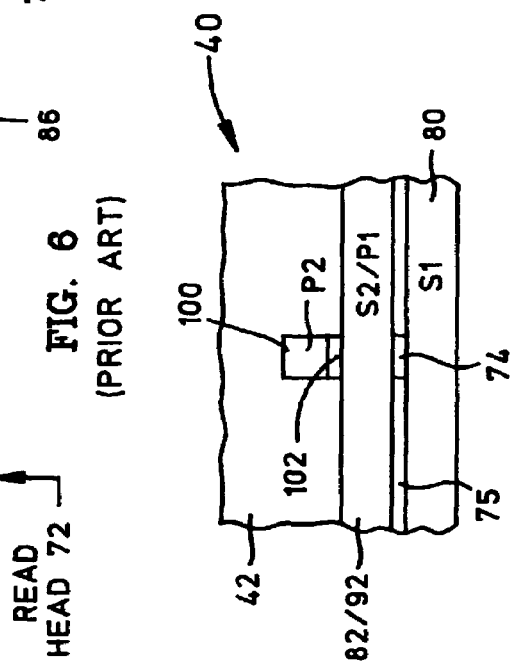
FIG. 6 (PRIOR ART)
FIG. 7 (PRIOR ART)
FIG. 8 (PRIOR ART)

METHOD FOR USE IN FORMING A READ SENSOR FOR A MAGNETIC HEAD

BACKGROUND OF THE INVENTION

1. Field of the Invention

The present invention relates generally to read sensors of magnetic heads in data storage devices, and more particularly to read sensors of the current-perpendicular-to-the-planes (CPP) type.

2. Description of the Related Art

Computers often include auxiliary memory storage devices having media on which data can be written and from which data can be read for later use. A direct access storage device (disk drive) incorporating rotating magnetic disks are commonly used for storing data in magnetic form on the disk surfaces. Data is recorded on concentric, radially spaced tracks on the disk surfaces. Magnetic heads which include read sensors are then used to read data from the tracks on the disk surfaces.

In high capacity disk drives, magnetoresistive (MR) read sensors, commonly referred to as MR heads, may be used to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer. The conventional MR sensor operates on the basis of the anisotropic magnetoresistive (AMR) effect in which the MR element resistance varies as the square of the cosine of the angle between the magnetization of the MR element and the direction of sense current flow through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage. Within the general category of MR sensors is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers. GMR sensors using only two layers of ferromagnetic material (e.g. nickel-iron, cobalt-iron, or nickel-iron-cobalt) separated by a layer of nonmagnetic material (e.g. copper) are generally referred to as spin valve (SV) sensors manifesting the SV effect.

One of the ferromagnetic (FM) layers referred to as the pinned layer has its magnetization typically pinned by exchange coupling with an antiferromagnetic (AFM) layer (e.g., nickel-oxide, iron-manganese, or platinum-manganese). The pinning field generated by the AFM pinning layer should be greater than demagnetizing fields to ensure that the magnetization direction of the pinned layer remains fixed during application of external fields (e.g. fields from bits recorded on the disk). The magnetization of the other FM layer referred to as the free layer, however, is not fixed and is free to rotate in response to the field from the information recorded on the magnetic medium (the signal field). The pinned layer may be part of an antiparallel (AP) pinned structure which includes an antiparallel coupling (APC) layer formed between first and second AP pinned layers. The first AP pinned layer, for example, may be the layer that is exchange coupled to and pinned by the AFM pinning layer. By strong antiparallel coupling between the first and second AP pinned layers, the magnetic moment of the second AP pinned layer is made antiparallel to the magnetic moment of the first AP pinned layer.

Sensors are classified as a bottom sensor or a top sensor depending upon whether the pinned layer is located near the bottom of the sensor close to the first read gap layer or near the top of the sensor close to the second read gap layer. Sensors are further classified as simple pinned or AP pinned depending upon whether the pinned structure is one or more FM layers with a unidirectional magnetic moment or a pair of AP pinned layers separated by the APC layer with magnetic moments of the AP pinned layers being antiparallel. Sensors are still further classified as single or dual wherein a single sensor employs only one pinned layer and a dual sensor employs two pinned layers with the free layer structure located there between.

A read sensor may also be of a current-perpendicular-to-the-planes (CPP) type in which current flows perpendicular to the major planes of the sensor layers. First and second shield layers engage the bottom and the top, respectively, of the sensor so as to simultaneously serve as electrically conductive leads for the sensor. The CPP sensor may be contrasted with a current in parallel to the-planes (CIP) type sensor in which the current is conducted in planes parallel to the major thin film planes of the sensor. In a CPP sensor, when the spacer layer between the free layer and the AP pinned structure is nonmagnetic and electrically conductive (such as copper), the current is referred to as a "sense current"; however when the spacer layer is nonmagnetic and electrically nonconductive (such as aluminum oxide), the current is referred to as a "tunneling current". Hereinafter, the current is referred to as a perpendicular current $I_p$ which can be either a sense current or a tunneling current.

When the magnetic moments of the pinned and free layers are parallel with respect to one another the resistance of the sensor to the perpendicular current $I_p$ is at a minimum, and when their magnetic moments are antiparallel the resistance of the sensor to the perpendicular current $I_p$ is at a maximum. A change in resistance of the sensor is a function of cosine $\theta$, where $\theta$ is the angle between the magnetic moments of the pinned and free layers. When the perpendicular current $I_p$ is conducted through the sensor, resistance changes, due to field signals from the rotating magnetic disk, cause potential changes that are detected and processed as playback signals. The sensitivity of the sensor is quantified with a magnetoresistive coefficient $\Delta r/R$, where $\Delta r$ is the change in resistance of the sensor from minimum resistance (magnetic moments of free and pinned layers parallel) to maximum resistance (magnetic moments of the free and pinned layers antiparallel) and R is the resistance of the sensor at minimum resistance.

CPP read sensors require insulator materials in the side regions to isolate the perpendicular current $I_p$ through the read sensor structure in the central region. The insulator materials are deposited in the side regions with a sufficient thickness so as to help align subsequently deposited magnetic hard bias materials with a free layer structure in the read sensor structure. The insulator materials, however, also become formed along sidewalls of the read sensor structure. Unfortunately, the sufficient thickness of the insulator materials necessary to achieve the alignment increases a separation distance between the free layer structure and the magnetic hard bias materials. This reality decreases the effectiveness of the magnetic hard bias materials. Further, metallic seed materials are also deposited to set a texture for the successful deposition of magnetic hard bias materials. However, the metallic seed materials also become formed along the sidewalls of the read sensor structure which further increases the separation distance between the free layer structure and the magnetic hard bias materials.

Conventional processes also utilize a bilayer resist structure during milling steps for removal of read sensor materials in the side regions, in order to define a trackwidth for the CPP sensor. In the bilayer resist structure, the bottom layer is undercut with respect to the top layer of the resist. Ion milling is used to remove read sensor layers not protected by the bilayer resist. Ion beam deposition may be used to subsequently deposit insulator, magnetic hard bias and lead materials over the structure. Due to the fact that the bottom layer of the resist is undercut with respect to the top layer, the insulator, magnetic hard bias, and lead materials do not coat the sides of the bottom layer of the resist. Thus the sides of the bottom layer of the resist and the overhang of the top layer of the resist are exposed so that solvents can be used to attack the resist layers and lift-off the insulator, magnetic hard bias and lead materials that coats the dual layer resist above the read sensor structure.

Problems arise, however, when one attempts to extend bilayer resist usage to very small dimensions for CPP sensors. Specifically, the bilayer resist results in the insulator materials being deposited over top edges of the read sensor structure. This results in poor track width control, current crowding, and removal of the insulator materials over the top edges of the sensor is difficult.

Accordingly, there is an existing need to overcome these and other deficiencies of the prior art.

SUMMARY

Methods for use in forming a CPP read sensor for a magnetic head are disclosed. In a particular example, a plurality of read sensor layers are formed over a first shield layer and a resist without undercuts is formed over the plurality of read sensor layers in a central region. With the resist in place, read sensor materials in side regions adjacent the central region are removed by milling to thereby form a read sensor structure in the central region. Insulator materials and metallic seed materials are then deposited in the side regions. High angle ion milling is performed to reduce a thickness of the insulator materials, the metallic seed materials, or both materials, along sidewalls of the read sensor structure. Magnetic hard bias materials are subsequently deposited over the metallic seed materials, and a second shield layer is formed over the structure after the resist is removed.

Advantageously, insulator materials are no longer formed over the top edges of the read sensor with use of the resist without undercuts. Further, the act of high angle ion milling the insulator/metallic seed materials from the sidewalls of the read sensor structure reduces a distance between edges of the hard bias materials and a free layer of the read sensor structure, to thereby increase the effectiveness of the hard bias materials.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 6 is a partial view of the slider and a merged magnetic head as seen in plane 6—6 of FIG. 2;

FIG. 7 is a partial ABS view of the slider taken along plane 7—7 of FIG. 6 to show the read and write elements of the magnetic head;

FIG. 8 is a view taken along plane 8—8 of FIG. 6 with all material above the coil layer and leads removed;

DETAILED DESCRIPTION OF THE PREFERRED EMBODIMENTS

Methods for use in forming a CPP read sensor for a magnetic head are disclosed. In a particular example, a plurality of read sensor layers are formed over a first shield layer and a resist without undercuts is formed over the plurality of read sensor layers in a central region. In this embodiment, the sidewalls of the resist are straight and substantially normal to the plane of the surface of deposited read sensor materials. With the resist in place, read sensor materials in side regions adjacent the central region are removed by milling to thereby form a read sensor structure in the central region. Insulator materials and metallic seed materials are then deposited in the side regions. High angle ion milling is performed to reduce a thickness of the insulator materials, the metallic seed materials, or both, along sidewalls of the read sensor structure after their respective depositions. Magnetic hard bias materials are subsequently deposited over the metallic seed materials, and a second shield layer is formed over the structure after the resist is removed. Advantageously, the high angle ion milling more closely positions the hard bias materials with a free layer structure in the read sensor structure, to thereby increase the effectiveness of the hard bias materials.

The following description is the best embodiment presently contemplated for carrying out the present invention. This description is made for the purpose of illustrating the general principles of the present invention and is not meant to limit the inventive concepts claimed herein.

Figure 1:
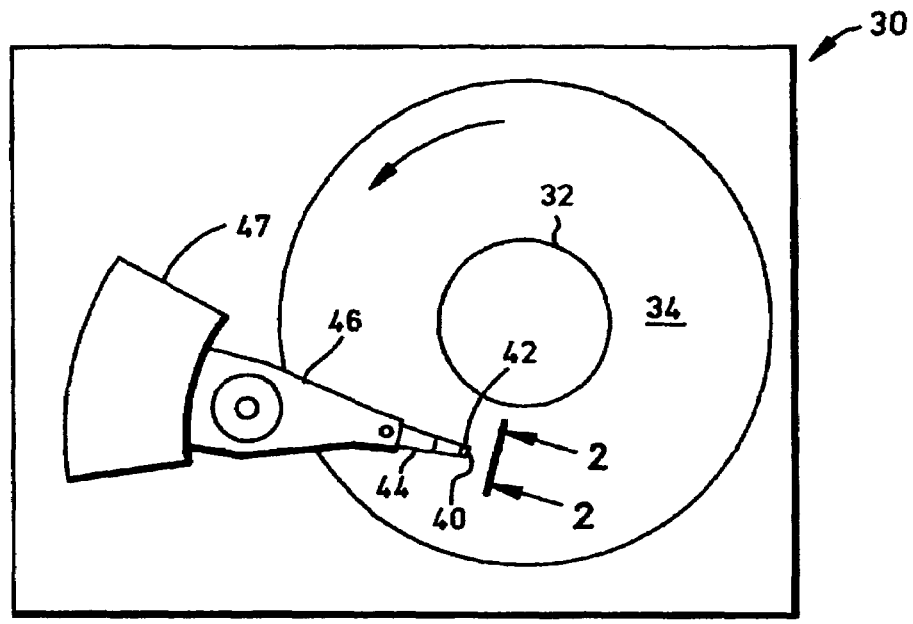
FIG. 1 is a plan view of an exemplary prior art magnetic disk drive.
Figure 2:
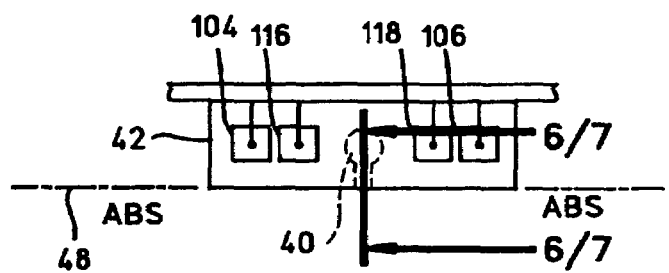
FIG. 2 is an end view of a slider with a magnetic head of the disk drive as seen in plane 2—2 of FIG. 1.
Figure 3:
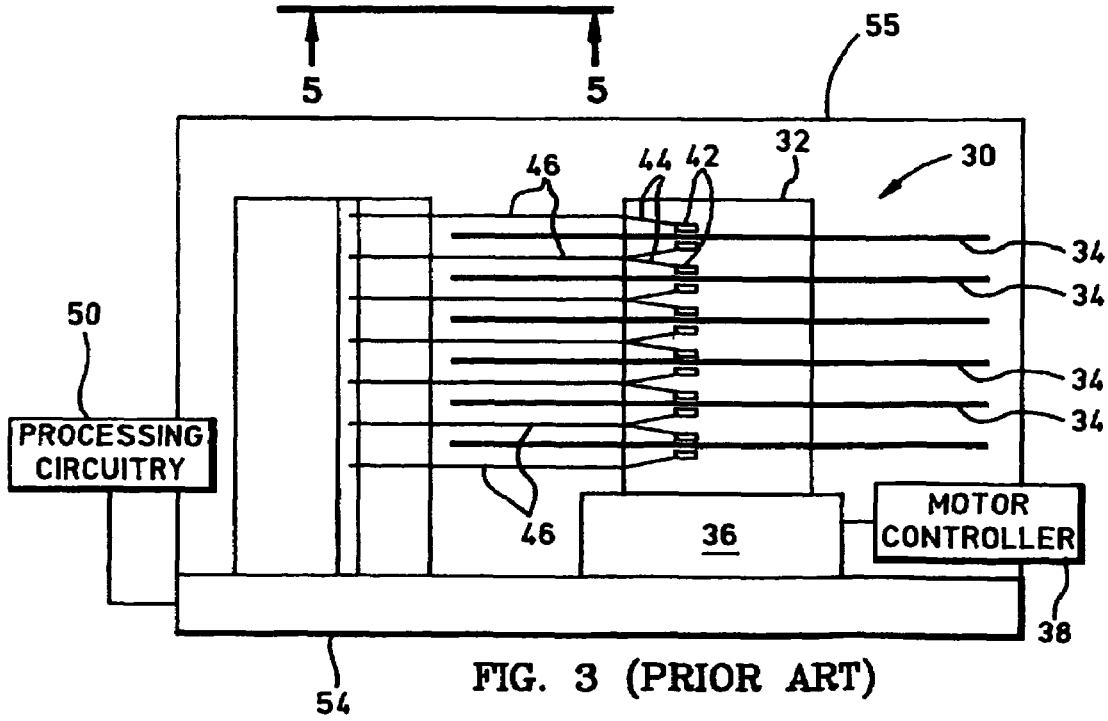
FIG. 3 is an elevation view of the magnetic disk drive wherein multiple disks and magnetic heads are employed.
Figure 4:
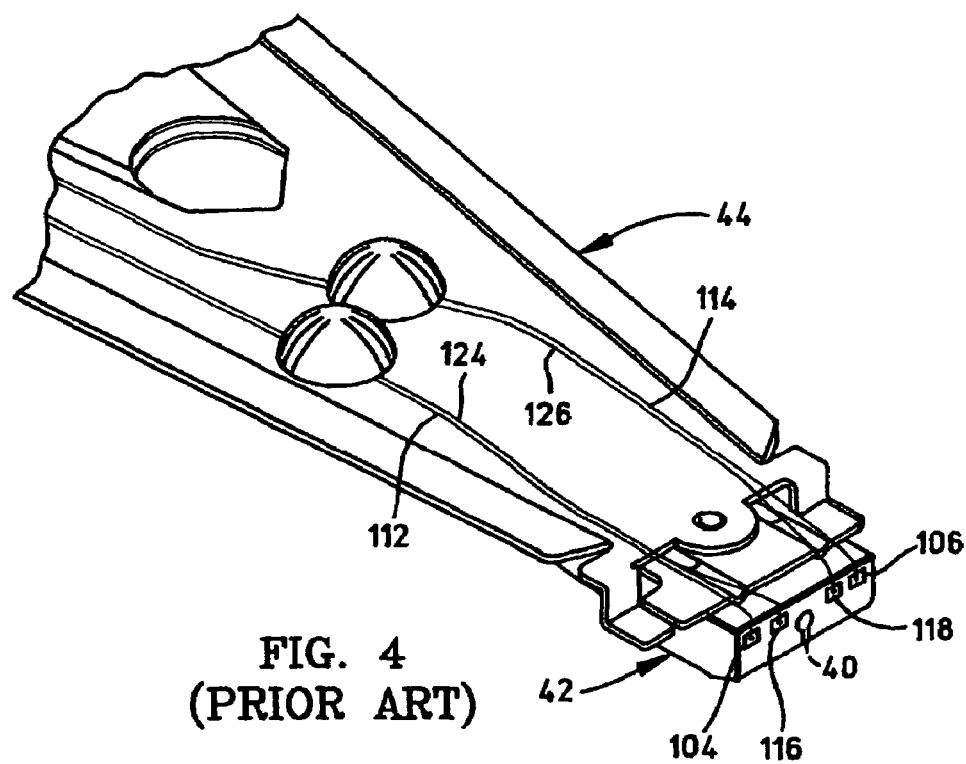
FIG. 4 is an isometric illustration of an exemplary prior art suspension system for supporting the slider and magnetic head.
Figure 5:
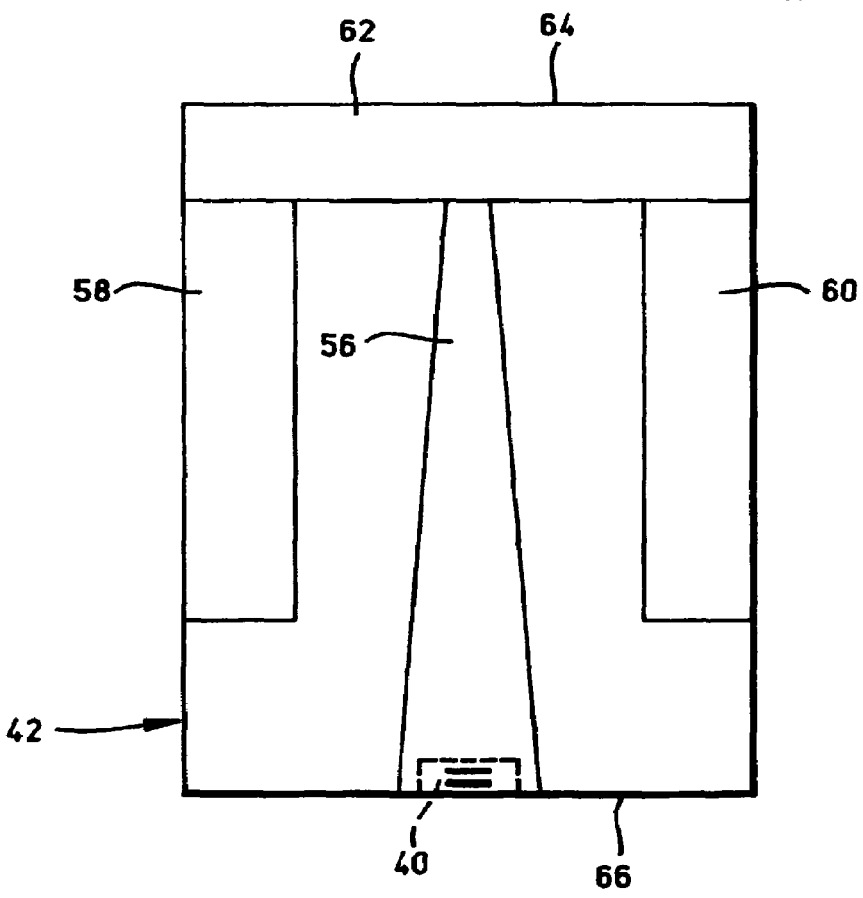
FIG. 5 is an ABS view of the magnetic head taken along plane 5—5 of FIG. 2.

Referring now to the drawings wherein like reference numerals designate like or similar parts throughout the several views, FIGS. 1–3 illustrate a magnetic disk drive 30. Disk drive 30 includes a spindle 32 that supports and rotates a magnetic disk 34. Spindle 32 is rotated by a spindle motor 36 that is controlled by a motor controller 38. A slider 42 includes a combined read and write magnetic head 40 and is supported by a suspension 44 and actuator arm 46 that is rotatably positioned by an actuator 47. Magnetic head 40 may utilize the read sensor which is made in accordance with the present invention. A plurality of disks, sliders, and suspensions may be employed in a large capacity direct access storage device (DASD) as shown in FIG. 3. Suspension 44 and actuator arm 46 are moved by actuator 47 to position slider 42 so that magnetic head 40 is in a transducing relationship with a surface of magnetic disk 34. When disk 34 is rotated by spindle motor 36, slider 42 is supported on a thin (typically, 0.05 μm) cushion of air (air bearing) between the surface of disk 34 and an air bearing surface (ABS) 48. Magnetic head 40 may then be employed for writing information to multiple circular tracks on the surface of disk 34, as well as for reading information therefrom. Processing circuitry 50 exchanges signals, representing such information, with head 40, provides spindle motor drive signals for rotating magnetic disk 34, and provides control signals to actuator 47 for moving slider 42 to various tracks. In FIG. 4, slider 42 is shown mounted to a suspension 44. The components described hereinabove may be mounted on a frame 54 of a housing 55, as shown in FIG. 3. FIG. 5 is an ABS view of slider 42 and magnetic head 40. Slider 42 has a center rail 56 that supports magnetic head 40, and side rails 58 and 60. Rails 56, 58 and 60 extend from a cross rail 62. With respect to rotation of magnetic disk 34, cross rail 62 is at a leading edge 64 of slider 42 and magnetic head 40 is at a trailing edge 66 of slider 42.

FIG. 6 is a side cross-sectional elevation view of a merged magnetic head 40, which includes a write head portion 70 and a read head portion 72. Read head portion 72 includes a giant magnetoresistive (GMR) read head which utilizes a GMR sensor 74. FIG. 7 is an ABS view of FIG. 6. GMR sensor 74 is sandwiched between nonmagnetic electrically insulative first and second read gap layers 76 and 78, and read gap layers 76 and 78 are sandwiched between ferromagnetic first and second shield layers 80 and 82. In response to external magnetic fields, the resistance of GMR sensor 74 changes. A sense current $I_s$ conducted through the sensor causes these resistance changes to be manifested as potential changes. These potential changes are then processed as readback signals by processing circuitry 50 shown in FIG. 3.

Write head portion 70 of magnetic head 40 includes a coil layer 84 sandwiched between first and second insulation layers 86 and 88. A third insulation layer 90 may be employed for planarizing the head to eliminate ripples in the second insulation layer caused by coil layer 84. The first, second and third insulation layers are referred to in the art as an "insulation stack". Coil layer 84 and first, second and third insulation layers 86, 88 and 90 are sandwiched between first and second pole piece layers 92 and 94. First and second pole piece layers 92 and 94 are magnetically coupled at a back gap 96 and have first and second pole tips 98 and 100 which are separated by a write gap layer 102 at the ABS. Since second shield layer 82 and first pole piece layer 92 are a common layer, this head is known as a merged head. In a piggyback head an insulation layer is located between a second shield layer and a first pole piece layer. As shown in FIGS. 2 and 4, first and second solder connections 104 and 106 connect leads from spin valve sensor 74 to leads 112 and 114 on suspension 44, and third and fourth solder connections 116 and 118 connect leads 120 and 122 from the coil 84 (see FIG. 8) to leads 124 and 126 on suspension 44.

Figure 9:
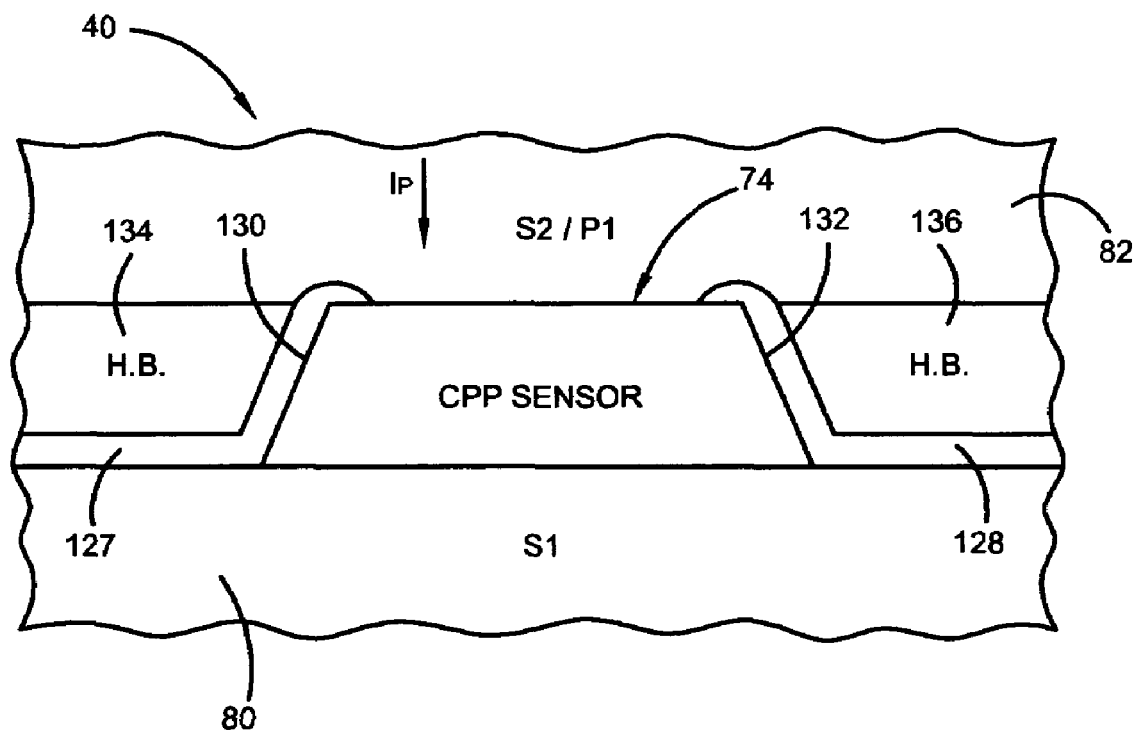
FIG. 9 is an enlarged isometric ABS illustration of a magnetic head having a current-perpendicular-to-the-planes (CPP) type sensor.

FIG. 9 is an enlarged ABS illustration of the prior art read head portion shown in FIG. 7. The read head includes the CPP sensor 74. First and second insulation layers 127 and 128, such as alumina, cover the first shield layer 80 on each side of the sensor 74 as well as slightly covering first and second side walls 130 and 132 of the sensor. Unfortunately, portions of insulation layers 127 and 128 may cover top side edges of the sensor as shown if a bilayer resist having undercuts is utilized in the sensor's fabrication. First and second hard bias layers (HB) 134 and 136 are on the insulation layers 127 and 128 and are adjacent the side walls 130 and 132. Metallic seed layers (not shown in FIG. 9) are formed between insulator layers 127 and 128 and hard bias layers 134 and 136. The hard bias layers 134 and 136 cause magnetic fields to extend longitudinally through the sensor 74 for stabilizing the free layer. The sensor 74 and the first and second hard bias layers 134 and 136 are located between ferromagnetic first and second shield layers 80 and 82 which may serve as leads for conducting the perpendicular current $I_p$ through the sensor 74.

Figure 10:
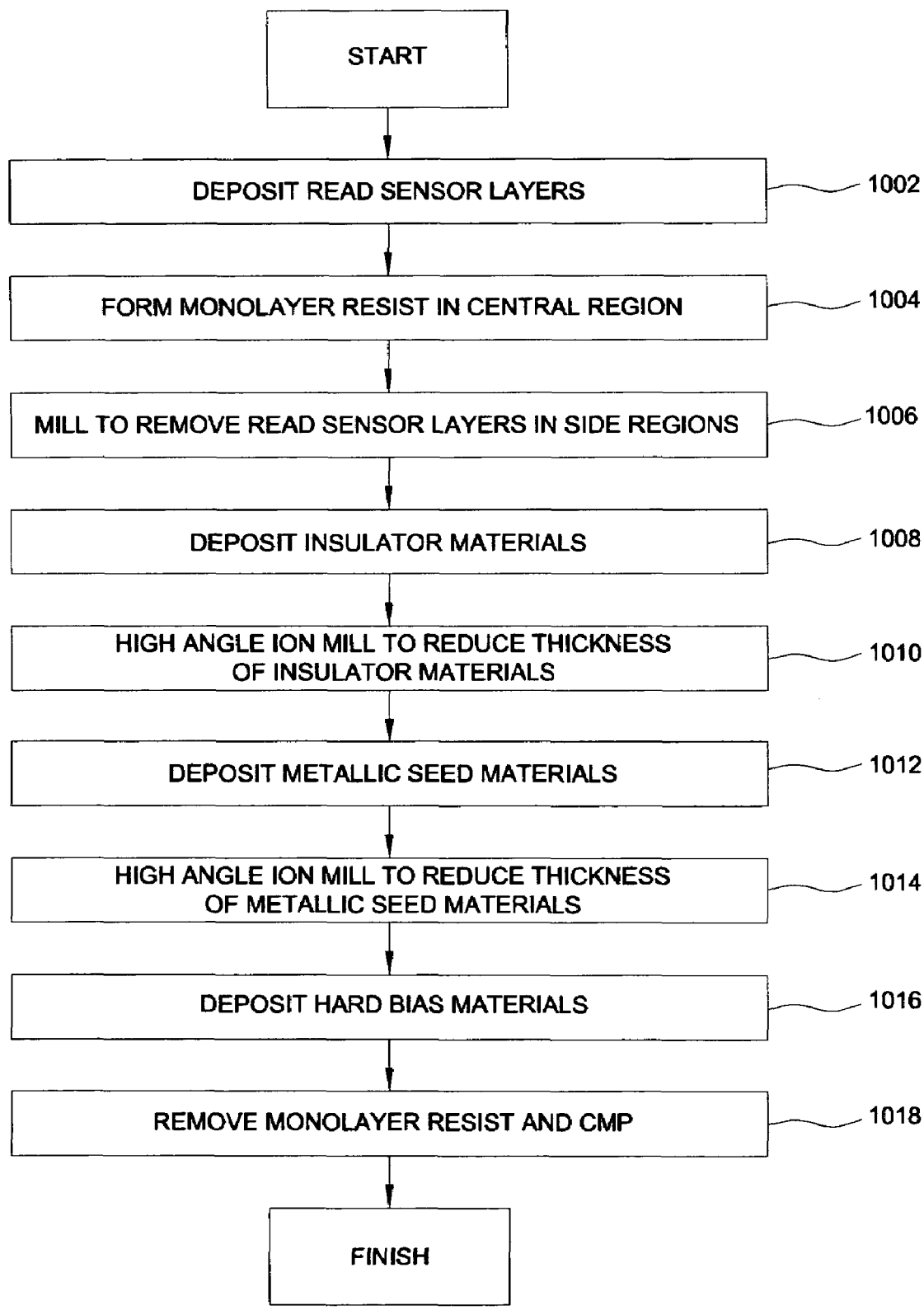
FIG. 10 is a flowchart which describes a fabrication process for a CPP read sensor which utilizes a combination of a resist without undercuts and high angle ion milling.

FIG. 10 is a flowchart which describes a fabrication process for a CPP read sensor which utilizes a combination of a resist without undercuts and high angle ion milling. FIGS. 11–20, which are a series of ABS illustrations showing partially fabricated sensor structures corresponding to the steps described in the flowchart of FIG. 10, will be referred to in combination with the flowchart steps of FIG. 10. The method of fabricating may be used to create a CPP read sensor for use in the disk drive shown and described earlier above.

Figure 11:
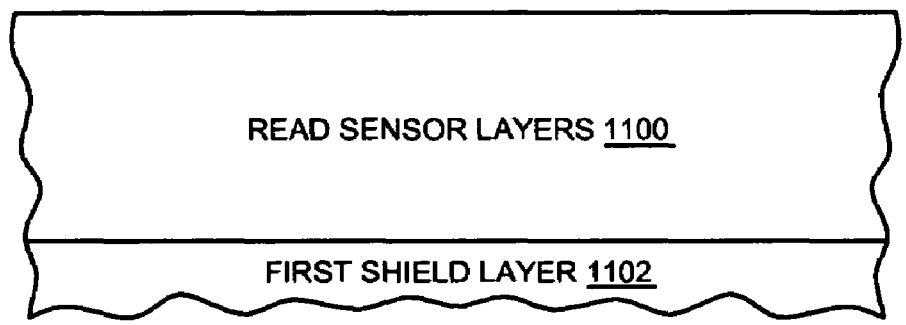
FIG. 11 is the first in a series of ABS illustrations of FIGS. 11–20 of partially fabricated sensor structures corresponding to the steps described in the flowchart of FIG. 10, showing that a plurality of read sensor layers are formed over a first shield layer.
Figure 12:
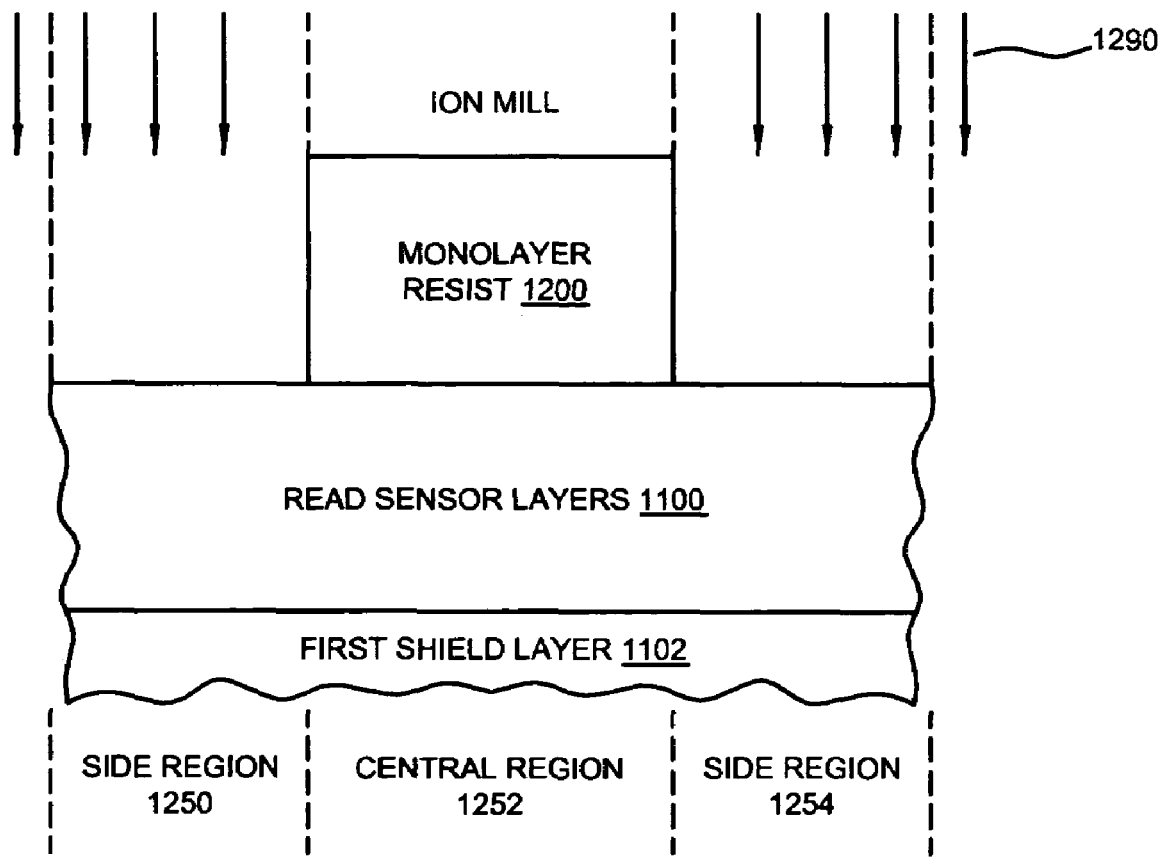
FIG. 12 is the second in a series of ABS illustrations of FIGS. 11–20 of partially fabricated sensor structures corresponding to the steps described in the flowchart of FIG. 10, which is the same as that shown in FIG. 11 except that a resist without undercuts is applied and patterned on top of the plurality of read sensor layers in a central region.

Beginning with FIG. 11, it is shown that a plurality of CPP read sensor layers 1100 are deposited over a first shield layer 1102 (step 1002 of FIG. 12). CPP read sensor layers 1100 may be made of any suitable sensor materials and includes a free layer structure (not shown in FIG. 11) formed therein. First shield layer 1102 may be made of any suitable magnetic material, such as nickel-iron (NiFe) or cobalt-iron (CoFe). In the present embodiment, first shield layer 1102 serves as a first electrically conducting lead for the CPP read sensor.

Next in FIG. 12, a resist without undercuts 1200 is applied and patterned over CPP read sensor layers 1100 in a central region 1252 using a photolithographic tool (step 1004 of FIG. 10). Resist 1200 is formed so as to not have any undercuts, but rather straight sidewalls from top to bottom; that is, the resist sidewalls are substantially normal to a plane defined by the previously deposited read sensor layers. Although resist 1200 may be a monolayer resist, it may alternatively be a multi-layered resist (e.g. bilayer or trilayer resist) as long as it is formed without undercuts. Resist 1200 is formed with a suitable width so as to define an appropriate trackwidth (TW) for the CPP read sensor. To form resist 1200 in central region 1252, a thin film of resist is light-exposed in regions which are to be removed, provided the resist is a positive resist. If the resist is a negative resist, it is light-exposed in regions that are to be retained. Next, the resist is subjected to a basic developer solution.

Figure 13:
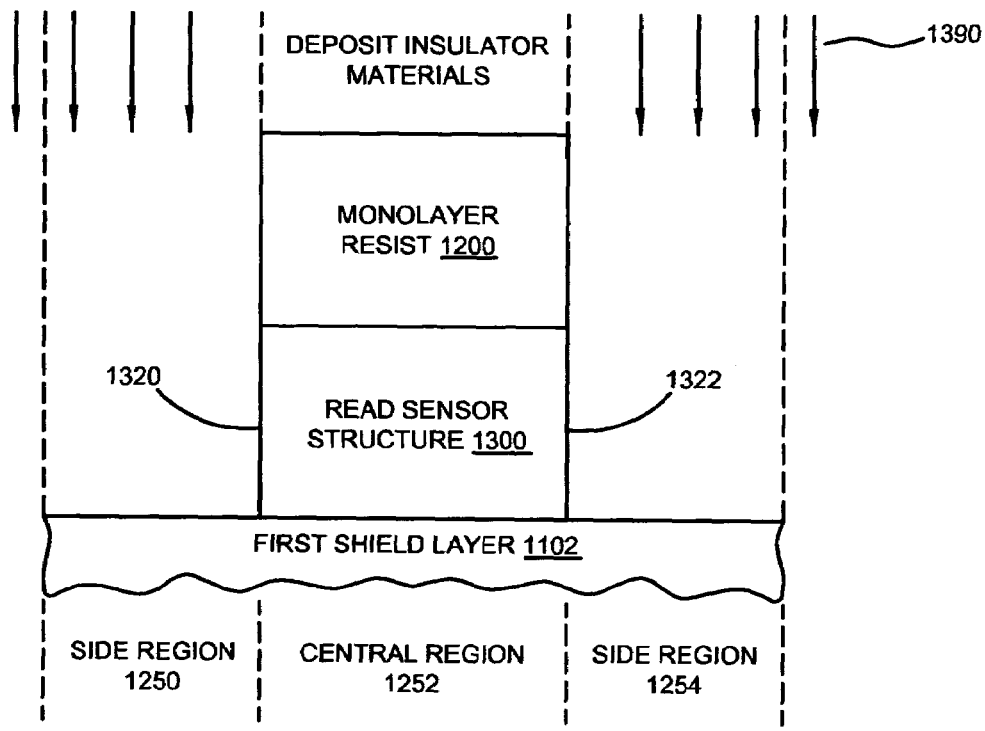
FIG. 13 is the third in a series of ABS illustrations of FIGS. 11–20 of partially fabricated sensor structures corresponding to the steps described in the flowchart of FIG. 10, which is the same as that shown in FIG. 12 except where read sensors materials are removed in the side regions from a previous ion milling process.

With resist 1200 in place, an ion milling process 1290 of FIG. 12 is performed to remove CPP read sensor layers 1100 in exposed side regions 1250 and 1254 (step 1006 of FIG. 10). The result is shown in FIG. 13. The ion milling process is discontinued once the top of first shield layer 1102 is reached, to thereby result in a read sensor structure 1300 formed only in central region 1252. As apparent, the ion milling process forms relatively sharp and steep side walls 1320 and 1322 from use of resist 1200. Top surface of read sensor structure 1300 are not exposed, as resist 1200 fully covers them.

Figure 14:
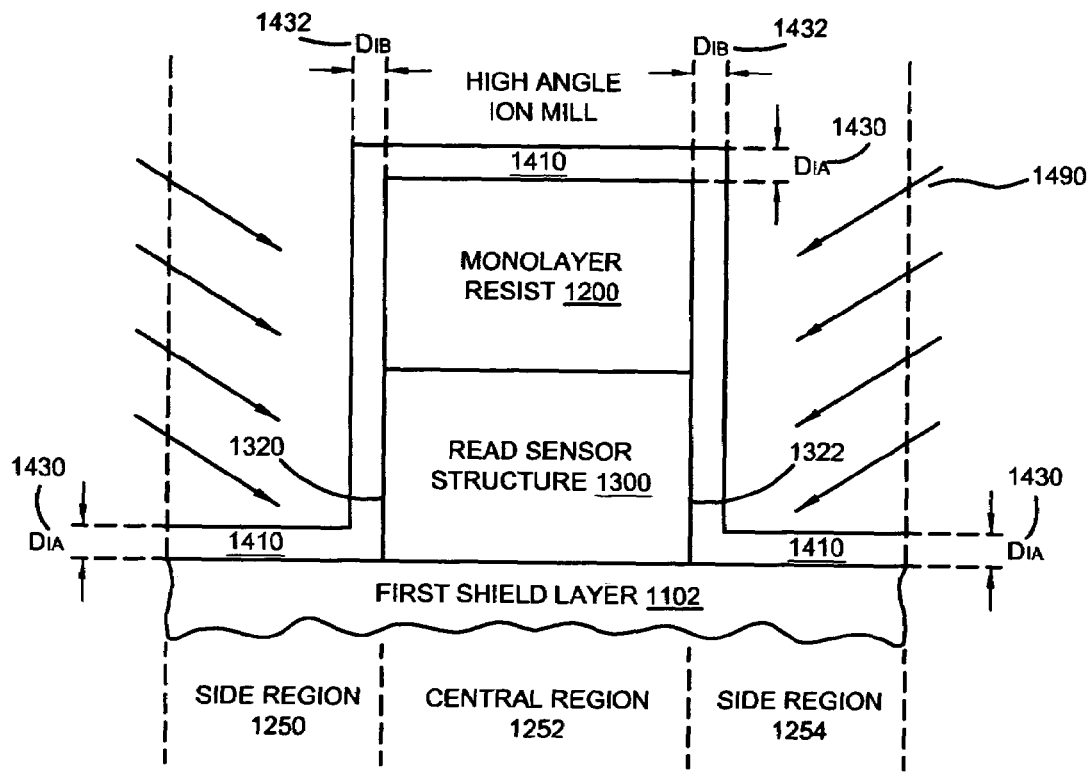
FIG. 14 is the fourth in a series of ABS illustrations of FIGS. 11–20 of partially fabricated sensor structures corresponding to the steps described in the flowchart of FIG. 10, which is the same as that shown in FIG. 14 except that insulator materials are deposited in the side regions and over the resist.

In FIG. 13, a deposition process 1390 is performed to deposit insulator materials over the structure (step 1008 of FIG. 10). The result is shown in FIG. 14. Note that insulator materials 1410 are formed in side regions 1250 and 1254, along sidewalls 1320 and 1322 of read sensor structure 1300, as well as all the way up and around resist 1200. In the present embodiment, insulator materials 1410 are used for confining a perpendicular current $I_p$ through read sensor structure 1300 in central region 1252 and may be made of any suitable dielectric material, such as alumina ($Al_2O_3$). Insulator materials 1410 are deposited in side regions 1250 and 1254 with a thickness $D_{IA}$ 1430 so as to help align subsequently deposited magnetic hard bias materials with a midplane of a free layer structure (not shown in FIG. 14) in read sensor structure 1300 after a subsequent high angle ion milling process (described later below).

Note that insulator materials 1410 are also deposited along sidewalls 1320 and 1322 with a thickness $D_{IB}$ 1432. In particular, thickness $D_{IB}$ 1432 may correspond to a thickness range of between 15–100% of $D_{IA}$ 1430. Unfortunately, thickness $D_{IB}$ 1432 increases a separation distance between edges of the free layer structure (not shown in FIG. 14) in read sensor structure 1300 and the subsequently deposited hard bias materials. This reality decreases the effectiveness of the hard bias materials if nothing is done to counteract it.

Figure 15:
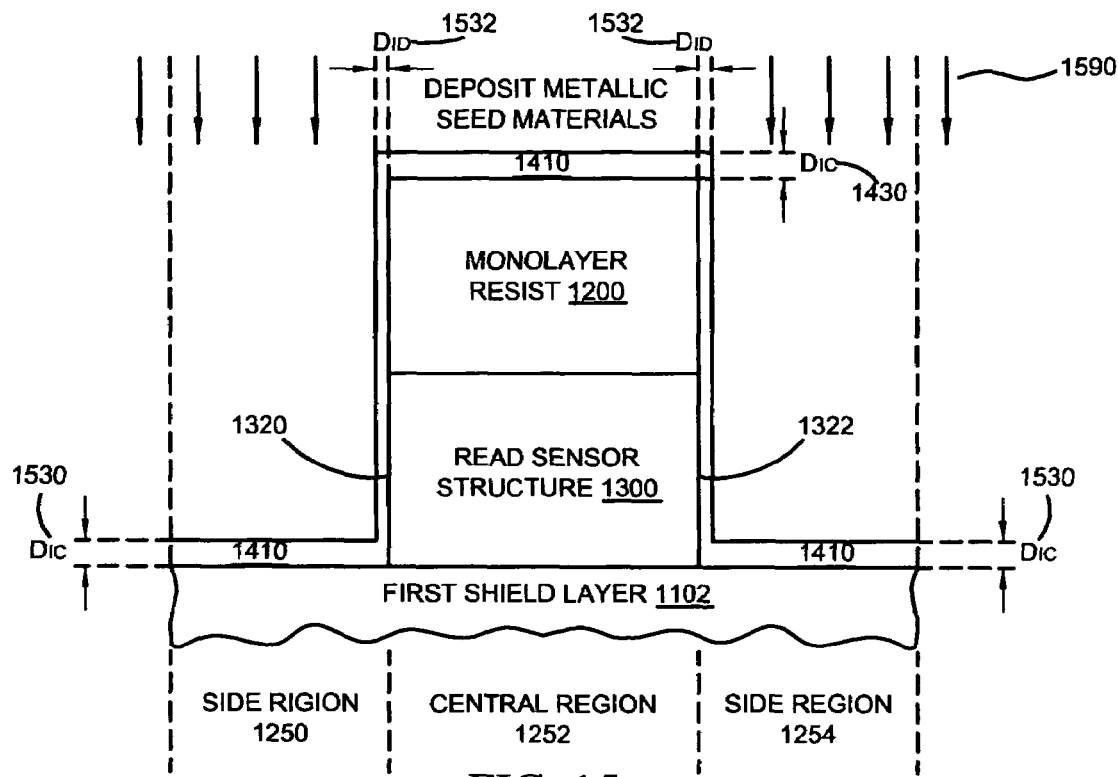
FIG. 15 is the fifth in a series of ABS illustrations of FIGS. 11–20 of partially fabricated sensor structures corresponding to the steps described in the flowchart of FIG. 10, which is the same as that shown in FIG. 13 except high angle ion milling is performed to reduce a thickness of the insulator materials along sidewalls of the read sensor structure.

In FIG. 14, a high angle ion milling 1490 may be performed to reduce thickness $D_{IB}$ 1432 of insulator materials 1410 along sidewalls 1320 and 1322 of read sensor structure 1300 (step 1010 of FIG. 10). The result is shown in FIG. 15, illustrating a reduced thickness $D_{ID}$ 1532. As defined herein, a high angle ion mill is an ion mill performed at angles of 40° to 80° from normal. Note that the high angle ion milling also nominally reduces the thickness $D_{IA}$ (FIG. 13) of insulator materials 1410 in side regions 1250 and 1254 to a reduced thickness $D_{IC}$ 1530. Thickness $D_{IC}$ 1530 helps position the subsequently deposited magnetic hard bias materials in alignment with the midplane of the free layer structure (not shown in FIG. 14) in read sensor structure 1300 as previously described. Note that high angle ion milling 1490 as performed does not compromise the integrity of insulator materials 1410 along sidewalls 1320 and 1322.

Figure 16:
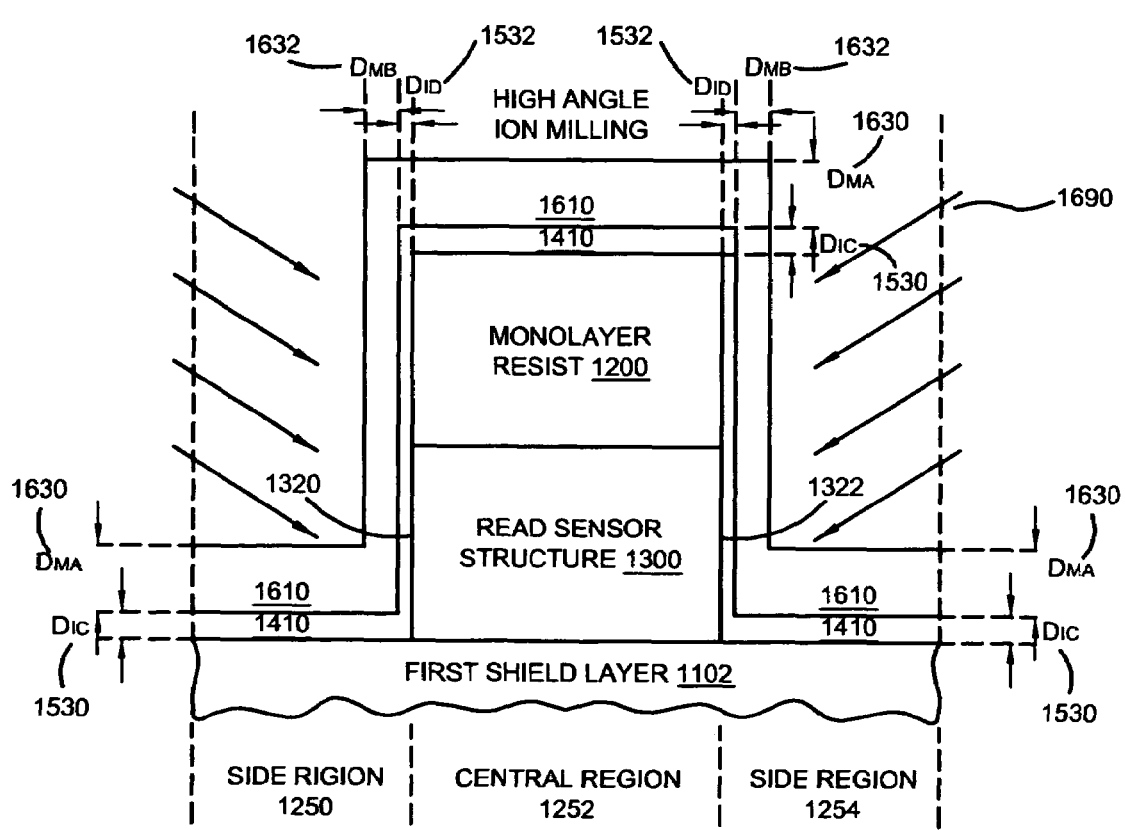
FIG. 16 is the sixth in a series of ABS illustrations of FIGS. 11–20 of partially fabricated sensor structures corresponding to the steps described in the flowchart of FIG. 10, which is the same as that shown in FIG. 15 except metallic seed materials are deposited in the side regions and over the insulator materials.

In FIG. 15, a deposition process 1590 is then performed to deposit metallic seed materials over the structure (step 1012 of FIG. 10). The result is shown in FIG. 16 with deposited metallic seed materials 1610. In particular, metallic seed materials 1610 may be deposited via ion beam sputtering deposition. Metallic seed materials 1610 are used to set a texture for subsequently deposited magnetic hard bias materials, and may be made of chromium (Cr) or other suitable materials. Note that metallic seed materials 1610 are formed in contact with insulator materials 1410. Metallic seed materials 1610 are deposited in side regions 1250 and 1254 with a thickness $D_{MA}$ 1630 so as to help align subsequently deposited magnetic hard bias materials with the midplane of the free layer structure (not shown in FIG. 16) after another subsequent high angle ion milling process (described later below).

Note that metallic seed materials 1610 are also formed along sidewalls 1320 and 1322 with a thickness $D_{MB}$ 1632. In particular, thickness $D_{MB}$ 1632 may correspond to a thickness range of between 20–40% of $D_{MA}$ 1630. Unfortunately, thickness $D_{MB}$ 1632 increases a separation distance between edges of the free layer structure (not shown in FIG. 16) in read sensor structure 1300 and the hard bias materials. This reality decreases the effectiveness of the subsequently deposited magnetic hard bias materials if nothing is done to counteract it.

Figure 17:
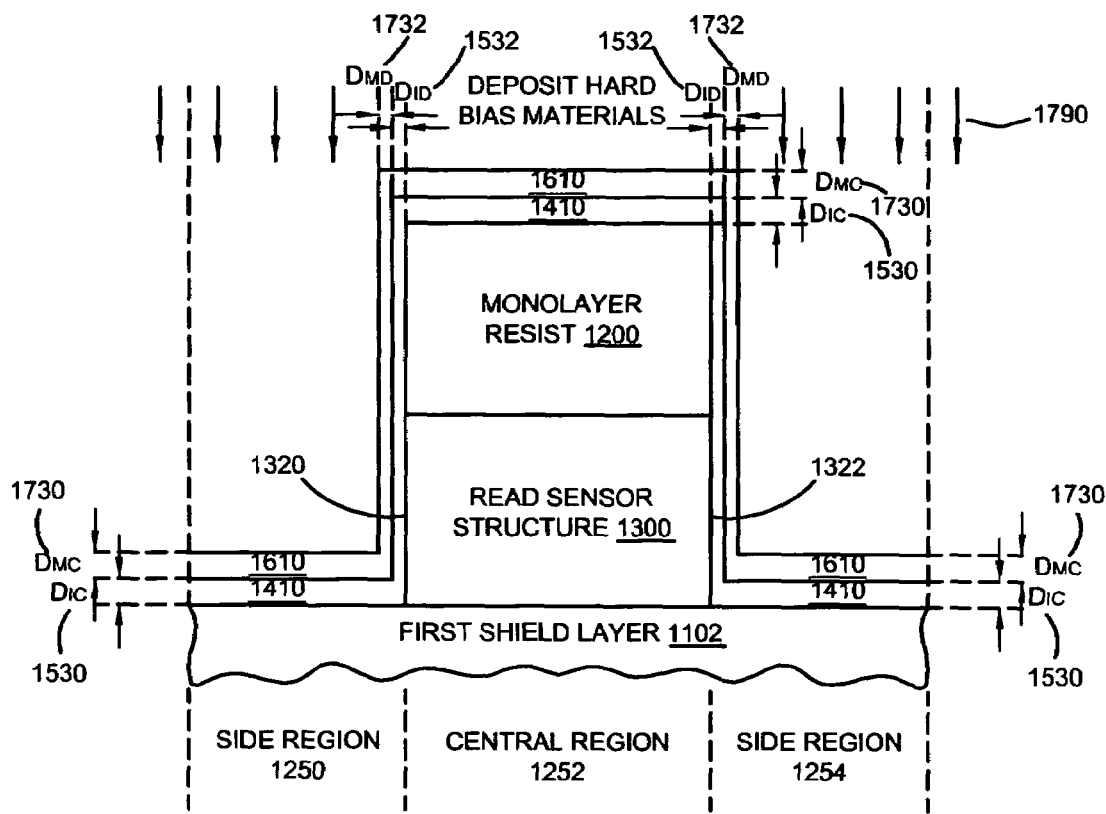
FIG. 17 is the seventh in a series of ABS illustrations of FIGS. 11–20 of partially fabricated sensor structures corresponding to the steps described in the flowchart of FIG. 10, which is the same as that shown in FIG. 16 except high angle ion milling is performed to reduce a thickness of the metallic seed materials along sidewalls of the read sensor structure.

In FIG. 16, a high angle ion milling 1690 is performed to reduce thickness $D_{MB}$ 1632 of metallic seed materials 1610 along sidewalls 1320 and 1322 (step 1014 of FIG. 10). The result is shown in FIG. 17, illustrating a reduced thickness $D_{MD}$ 1732. As defined herein, a high angle ion mill is an ion mill performed at angles of 40° to 80° from normal. Thickness $D_{MD}$ 1732 is made sufficiently thin or eliminated so as to substantially reduce the separation distance between the free layer structure and the magnetic hard bias materials, and therefore increase the effectiveness of the magnetic hard bias materials. Note that the high angle ion mill further nominally reduces thickness $D_{MA}$ 1630 of metallic seed materials 1610 in side regions 1250 and 1254 to a reduced thickness $D_{MC}$ 1730. Thickness $D_{MC}$ 1730 helps position subsequently deposited magnetic hard bias materials in alignment with the midplane of the free layer structure (not shown in FIG. 17) in read sensor structure 1300 as previously described. Optionally, after the high angle ion mill, a fresh thin coat of additional seed layer material may be formed over the wafer prior to the hard bias deposition.

Figure 18:
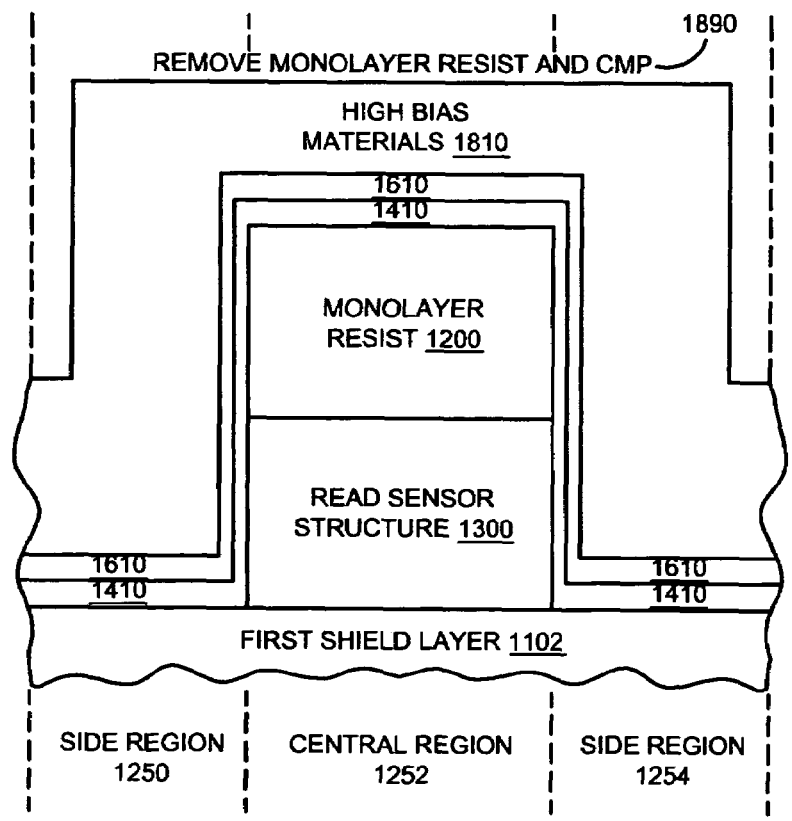
FIG. 18 is the eighth in a series of ABS illustrations of FIGS. 11–20 of partially fabricated sensor structures corresponding to the steps described in the flowchart of FIG. 10, which is the same as that shown in FIG. 17 except hard bias materials are deposited over metallic seed materials.
Figure 19:
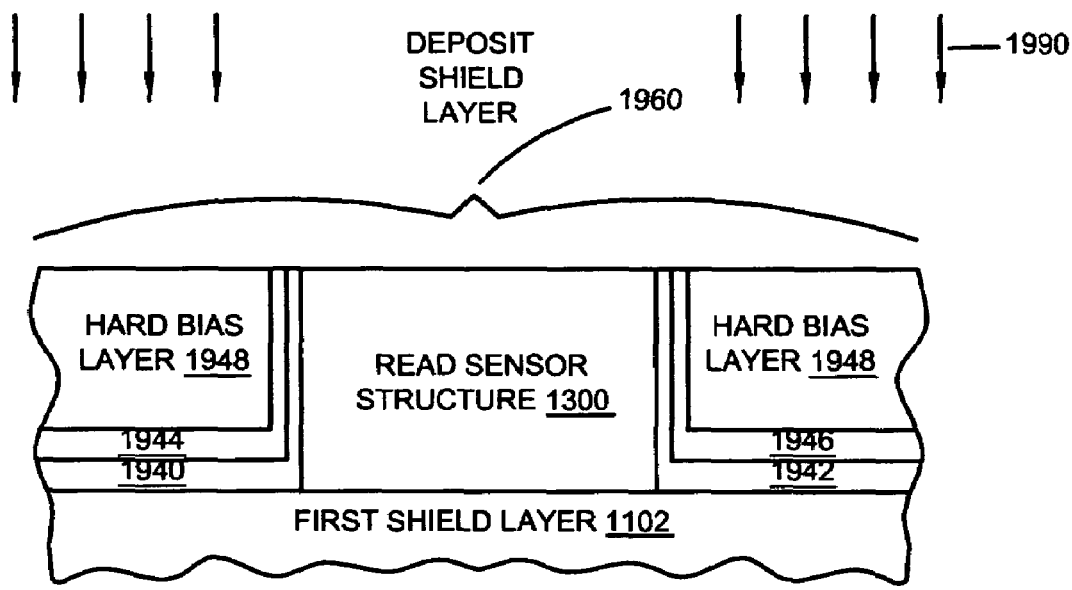
FIG. 19 is the ninth in a series of ABS illustrations of FIGS. 11–20 of partially fabricated sensor structures corresponding to the steps described in the flowchart of FIG. 10, which is the same as that shown in FIG. 18 except the resist is removed and a chemical mechanical polishing step is performed to produce a planarized top surface.

In FIG. 17, magnetic hard bias materials 1810 are then deposited over metallic seed materials 1610 (step 1016 of FIG. 10). The result is shown in FIG. 18. In particular, magnetic hard bias materials 1810 may be deposited via ion beam sputtering deposition. Magnetic hard bias materials 1810 may be any suitable hard magnet material, such as cobalt-platinum-chromium (Co—Pt—Cr) or other cobalt-based alloy. In FIG. 18, a planarization process 1890 such as a chemical-mechanical polishing (CMP) is used to remove resist 1200 and to form a planarized top surface (step 1018 of FIG. 10). The resulting planarized top surface 1960 is shown in FIG. 19. Due to the removal of materials in central region 1252 from the CMP, insulator materials 1410 become separated insulator layers 1940 and 1942 in side regions 1250 and 1254, respectively; metallic seed materials 1610 become separated metallic seed layers 1944 and 1946 in side regions 1250 and 1254, respectively; and magnetic hard bias materials 1810 become separated magnetic hard bias layers 1948 and 1950, respectively.

Figure 20:
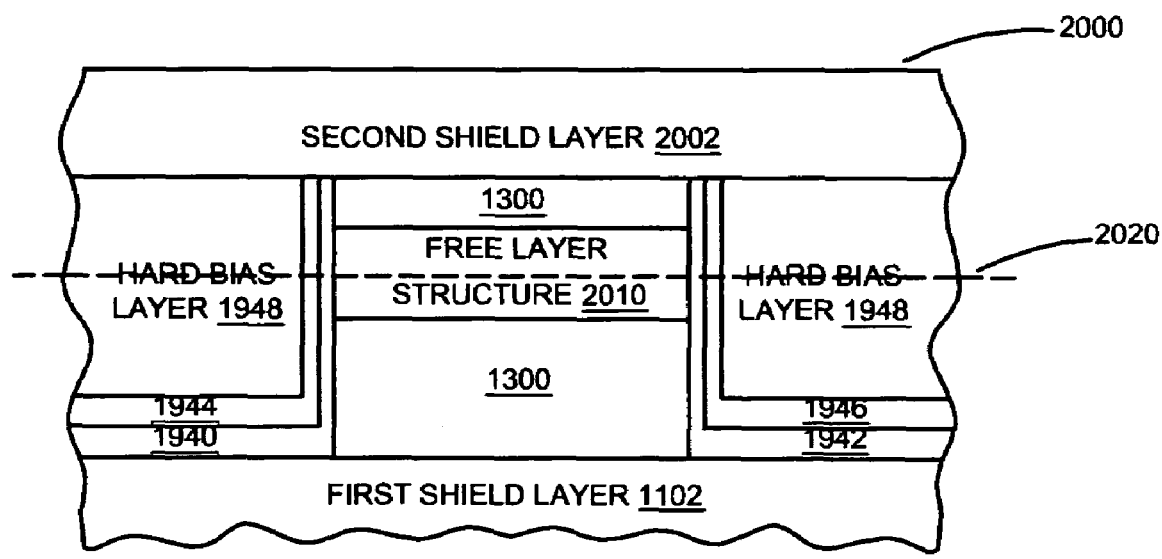
FIG. 20 is the tenth in a series of ABS illustrations of FIGS. 11–20 of partially fabricated sensor structures, which is the same as that shown in FIG. 19 except a second shield layer is deposited over the planarized top surface.

In FIG. 19, a deposition process 1990 is performed to deposit second shield layer 2002 over planarized surface 1960. The result is shown in FIG. 20. Second shield layer 1102 may be made of any suitable magnetic material, such as NiFe or CoFe. Note that second shield layer 2002 is formed in contact with planarized surface 1960 and the top of read sensor structure 1300. In the present embodiment, second shield layer 2002 also serves as a second electrically conducting lead for CPP read sensor 2000. Deposition process 1990 completes all manufacturing steps associated with the present invention, resulting in a CPP read sensor 2000 shown in FIG. 20. As discussed previously, insulator materials 1410 and metallic seed materials 1610 are formed with a sufficient thickness in the side regions so as to help align magnetic hard bias materials 1810 with a midplane 2020 of a free layer structure 2010 of read sensor structure 1300.

Thus, methods for use in forming a CPP read sensor for a magnetic head have been described. In a particular example, a plurality of read sensor layers are formed over a first shield layer and a resist without undercuts is formed over the plurality of read sensor layers in a central region. With the resist in place, read sensor materials in side regions adjacent the central region are removed by milling to thereby form a read sensor structure in the central region. Insulator materials and metallic seed materials are then deposited in the side regions. High angle ion milling is performed to reduce a thickness of the insulator materials, the metallic seed materials, or both, along sidewalls of the read sensor structure after their respective depositions. Magnetic hard bias materials are subsequently deposited over the metallic seed materials, and a second shield layer is formed over the structure after the resist is removed. Advantageously, insulator materials are no longer formed over the top edges of the read sensor using the resist without undercuts. Furthermore, the act of high angle ion milling the insulator/metallic seed materials from the sidewalls of the read sensor structure reduces a distance between edges of the hard bias materials and the free layer structure of the read sensor structure, to thereby increase the effectiveness of the hard bias materials.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special meaning different from their plain language meaning, and therefore the specification is not to be used to define terms in an unduly narrow sense.

What is claimed is:

1. A method for use in forming a read sensor for a magnetic head, comprising:
   forming a plurality of read sensor layers over a first shield layer;
   forming a resist without undercuts over the plurality of read sensor layers in a central region;
   with the resist in place:
     milling so that read sensor materials in side regions adjacent the central region are removed to thereby form a read sensor structure in the central region;
     depositing insulator materials in the side regions and over the resist;
     depositing metallic seed materials over the insulator materials; and
     high angle ion milling to reduce a thickness of the metallic seed materials along sidewalls of the read sensor structure.

2. The method of claim 1, further comprising:
   depositing magnetic hard bias materials over the metallic seed materials;
   removing the resist; and
   depositing a second shield layer over the read sensor structure and the magnetic hard bias materials in the side regions.

3. The method of claim 1, wherein the read sensor comprises a current-perpendicular-to-the-planes (CPP) read sensor.

4. The method of claim 1, wherein the first and second shield layers also act as first and second lead layers in a current-perpendicular-to-the-planes (CPP) read sensor.

5. The method of claim 1, wherein the act of performing high angle ion milling corresponds to angles ranging from 40° to 80°.

6. The method of claim 1, further comprising:
   wherein the plurality of read sensor layers are formed with a free layer structure; and
   wherein the metallic seed materials are deposited with a sufficient thickness so as to help position hard bias materials in alignment with the free layer structure.

7. The method of claim 1, further comprising:
   prior to depositing the metallic seed materials, high angle ion milling the insulator materials from the sidewalls of the read sensor structure.

8. The method of claim 1, further comprising:
   wherein the act of high angle ion milling of the metallic seed materials from the sidewalls of the read sensor structure reduces a spacing between hard bias materials and a free layer structure in the read sensor structure.

9. The method of claim 1, further comprising:
   after performing the high angle ion mill, depositing additional metallic seed materials over the milled metallic seed materials.

10. A method for use in forming a read sensor for a magnetic head, comprising:
    forming a plurality of read sensor layers over a first shield layer;
    forming a resist without undercuts over the plurality of read sensor layers in a central region;
    with the resist in place:
      milling so that read sensor materials in side regions adjacent the central region are removed to thereby form a read sensor structure in the central region;

depositing insulator materials in the side regions and over the resist; and high angle ion milling to reduce a thickness of the insulator materials along sidewalls of the read sensor structure.

11. The method of claim 10, further comprising:
depositing metallic seed materials over the insulator materials; and
depositing magnetic hard bias materials over the metallic seed materials.

12. The method of claim 10, further comprising:
depositing metallic seed materials over the insulator materials;
high angle ion milling to reduce a thickness of the metallic seed materials along sidewalls of the read sensor structure; and
depositing magnetic hard bias materials over the metallic seed materials.

13. The method of claim 10, further comprising:
depositing metallic seed materials over the insulator materials;
high angle ion milling to reduce a thickness of the metallic seed materials along sidewalls of the read sensor structure;
depositing magnetic hard bias materials over the metallic seed materials;
removing the resist; and
depositing a second shield layer over the read sensor structure and the magnetic hard bias materials in the side regions.

14. The method of claim 10, wherein the read sensor comprises a current-perpendicular-to-the-planes (CPP) read sensor.

15. The method of claim 10, wherein the first and second shield layers also act as first and second lead layers in a current-perpendicular-to-the-planes (CPP) read sensor.

16. The method of claim 10, wherein the act of performing high angle ion milling corresponds to angles ranging from 40° to 80°.

17. The method of claim 10, further comprising:
wherein the plurality of read sensor layers are formed with a free layer structure; and
wherein the insulator materials are deposited with a sufficient thickness so as to help position hard bias materials in alignment with the free layer structure.

18. The method of claim 10, further comprising:
wherein the act of high angle ion milling the insulator materials from the sidewalls of the read sensor structure helps reduce a distance between edges of hard bias materials and a free layer structure of the read sensor structure.

19. The method of claim 10, further comprising:
depositing metallic seed materials over the insulator materials;
high angle ion milling to reduce a thickness of the metallic seed materials along sidewalls of the read sensor structure;
depositing magnetic hard bias materials over the metallic seed materials; and
wherein the act of high angle ion milling of the metallic seed materials from the sidewalls of the read sensor structure reduces a distance between the magnetic hard bias materials and a free layer structure of the read sensor structure.

20. A method for use in forming a read sensor for a magnetic head, comprising:
forming a plurality of read sensor layers directly over a first shield layer;
forming a resist without undercuts over the plurality of read sensor layers in a central region;
with the resist in place:
milling so that read sensor materials in side regions adjacent the central region are removed to thereby form a read sensor structure in the central region;
depositing insulator materials in the side regions and over the resist;
high angle ion milling to reduce a thickness of the insulator materials along sidewalls of the read sensor structure;
depositing metallic seed materials over the insulator materials;
high angle ion milling to reduce a thickness of the metallic seed materials along sidewalls of the read sensor structure;
depositing magnetic hard bias materials over the metallic seed materials;
removing the resist; and
depositing a second shield layer over the read sensor structure and the hard bias materials in the side regions.

21. The method of claim 20, wherein the read sensor comprises a current-perpendicular-to the-planes (CPP) read sensor.

22. The method of claim 20, wherein the first and second shield layer materials comprise one of nickel-iron (Ni—Fe) and cobalt-iron (Co—Fe).

23. The method of claim 20, wherein the first and second shield layers also act as first and second lead layers in a current-perpendicular-to-the-planes (CPP) read sensor.

24. The method of claim 20, wherein the insulator material comprises alumina ($Al_2O_3$).

25. The method of claim 20, wherein the metallic seed material comprises chromium (Cr).

26. The method of claim 20, wherein the act of performing high angle ion milling corresponds to angles ranging from 40° to 80°.

27. The method of claim 20, wherein the magnetic hard bias materials comprise cobalt-platinum-chromium (Co—Pt—Cr).

28. The method of claim 20, further comprising:
wherein the plurality of read sensor layers are formed with a free layer structure; and
wherein the insulator materials are deposited with a sufficient thickness so as to help position the magnetic hard bias materials in alignment with the free layer structure.

29. The method of claim 20, further comprising:
wherein the act of high angle ion milling the insulator materials from the sidewalls of the read sensor structure helps reduce a distance between edges of the hard bias materials and a free layer structure of the read sensor structure.

30. The method of claim 20, further comprising:
prior to depositing the magnetic hard bias materials, forming additional metallic seed materials over the milled metallic seed materials.

* * * * *